J. W. RAYMOND.
CARBURETER.
APPLICATION FILED OCT. 19, 1910.

1,088,091.

Patented Feb. 24, 1914.
3 SHEETS—SHEET 1.

Witnesses
Frank A. Fahle
Thomas H. McMeans

Inventor
John W. Raymond
By Bradford Hood
Attorneys

J. W. RAYMOND.
CARBURETER.
APPLICATION FILED OCT. 19, 1910.

1,088,091.

Patented Feb. 24, 1914.
3 SHEETS—SHEET 2.

Witnesses
Frank A. Fahle
Thomas W. McMeans

Inventor
John W. Raymond,
By Bradford Hood
Attorneys.

J. W. RAYMOND.
CARBURETER.
APPLICATION FILED OCT. 19, 1910.

1,088,091.

Patented Feb. 24, 1914.
3 SHEETS—SHEET 3.

Witnesses
Frank A. Fahle
May Layden

Inventor
John W. Raymond,
By Bradford Hood
Attorney

UNITED STATES PATENT OFFICE.

JOHN W. RAYMOND, OF DAYTON, OHIO, ASSIGNOR TO THE AIR FRICTION CARBURETOR COMPANY, OF DAYTON, OHIO, A CORPORATION OF OHIO.

CARBURETER.

1,088,091.  Specification of Letters Patent.  Patented Feb. 24, 1914.

Application filed October 19, 1910. Serial No. 587,958.

*To all whom it may concern:*

Be it known that I, JOHN W. RAYMOND, a citizen of the United States, residing at Dayton, in the county of Montgomery and State of Ohio, have invented a new and useful Carbureter, of which the following is a specification.

The object of my invention is to produce a carbureter by means of which a liquid hydrocarbon and an air current may be uniformly produced and delivered to an internal combustion engine.

The accompanying drawings illustrate my invention.

Figure 1:
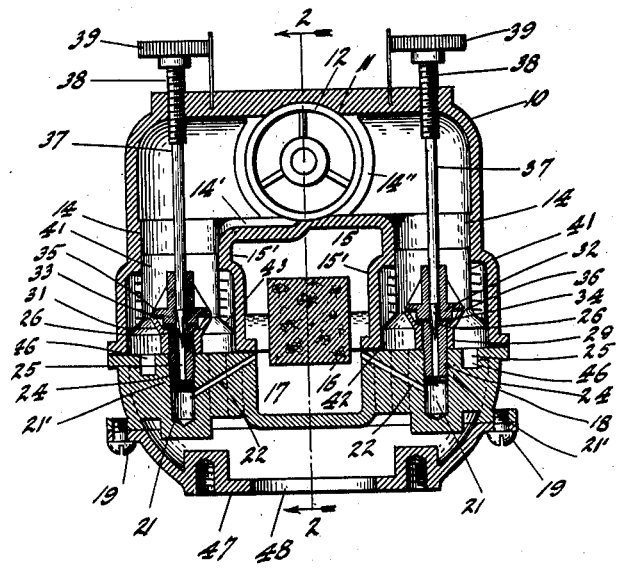
Figure 2:
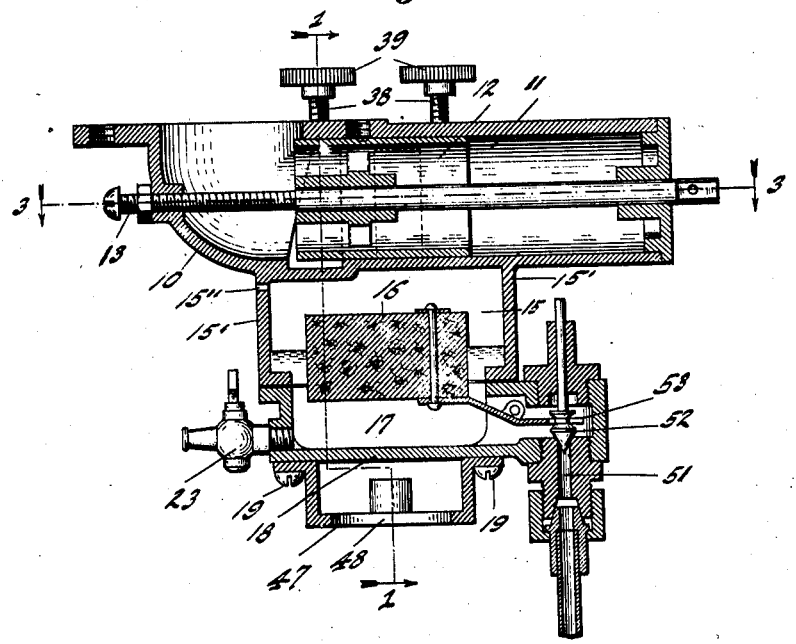
Figure 3:
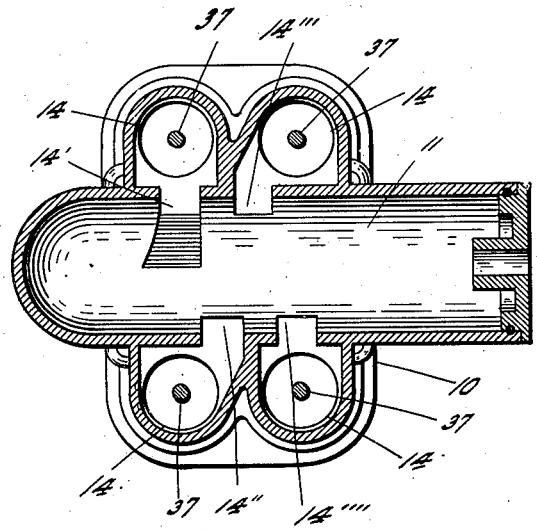
Figure 4:
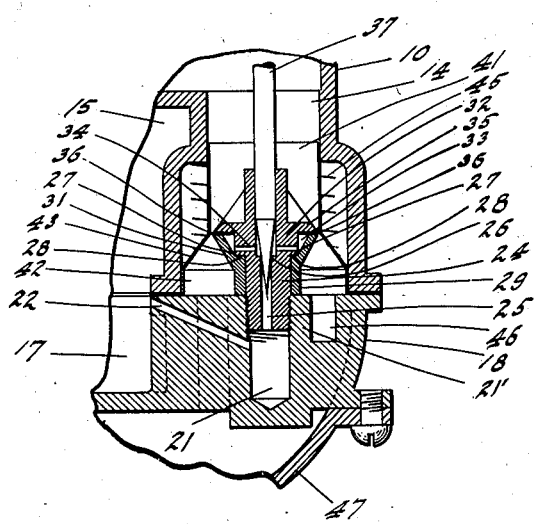
Figure 6:
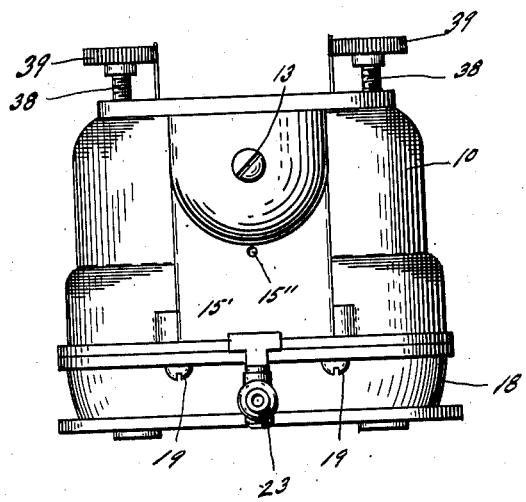
Figure 5:
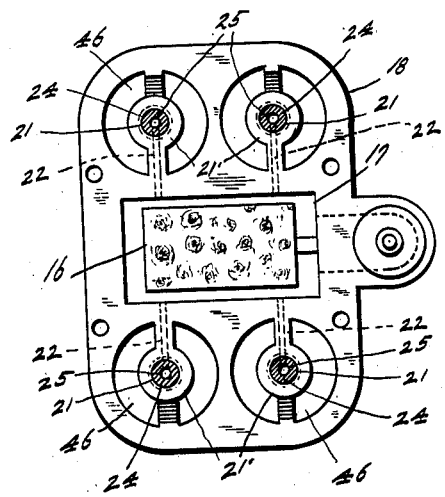

Figure 1 is a transverse section on line 1—1 of Fig. 2; Fig. 2 a longitudinal section on line 2—2 of Fig. 1; Fig. 3 a horizontal section on line 3—3 of Fig. 2; Fig. 4 a detail of the carbureting unit practically full size and accurately proportioned. Fig. 5 a plan of the top of the casting 18, and Fig. 6 a side elevation of the structure with the air manifold omitted.

I have illustrated my improvements in the form of a multiple jet carbureter and I believe that there are some features of novelty in this arrangement but the principal feature of my invention resides in the carbureting unit by means of which the liquid hydrocarbon is delivered to an absorbing air current.

In the drawings, 10 indicates the main body of my carbureter which, in the present instance, is shown as comprising a valve chamber 11 in the main cylindrical portion of which is mounted an axially slidable throttle valve 12, the amount of axial movement being regulated in one direction by means of an adjustable abutment 13. Arranged alongside chamber 11 and below the same are a plurality of carbureting units intended to deliver cumulatively into chamber 11 and therefore the main body 10 comprises a plurality of downwardly extending tubes or passageways 14 which are grouped symmetrically relative to the chamber 11. The several tubes 14 are preferably formed integral with the main body 10 and are so connected and united as to form an open bottomed chamber 15 below chamber 11 and between tubes 14, the ends of said chamber being formed by vertical walls 15', 15'. This open bottomed chamber 15 is vented at 15'' and forms the upper part of a fuel chamber in which a float 16 of ordinary form is mounted. The lower part of the fuel chamber is formed by a chamber 17 which complements chamber 15 and is formed in the middle of a casting 18 which is detachably secured to the lower end of casing 10 by screws 19.

Formed in axial alinement with each tube 14 in casting 18 is a bore 21, the lower end of which communicates with the interior of the fuel chamber by means of an inclined passageway 22. This passageway is formed at an angle to bore 21 and begins at a point close to the upper face of casting 18 so that it may be readily formed by drilling and by this arrangement the inlet end of the passage 22 lies so far above the bottom of the fuel chamber that a considerable quantity of water may gather in the fuel chamber without passing into the bores 21. A pet cock 23 leads from the lowest point of the pocket 17 so that this pocket may be readily drained of dirt and water. The upper end of each bore 21 is threaded to receive the threaded shank of a bushing 24 which is provided with an axial bore 25 enlarged at its upper end so as to form an intermediate valve seat 26. This bushing is also provided with an intermediate outwardly extending shoulder 27 so formed that, when the bushing is in place, the shoulder will rest firmly upon the shoulder 28 formed within a collar 29, this collar having an outwardly and upwardly flaring flange 31 which surrounds the middle portion 32 of bushing 24 so as to form an annular fuel pocket or reservoir 33 which is fed by means of radial passages 34 communicating with bore 25 of bushing 24 at a point above the valve seat 26, and at the bottom of reservoir 33 so as to insure constant flow of fuel through said reservoir. Above the passages 34, the bushing 24 is provided with an overhanging circular flange 35 which, when the shoulder 27 is brought down against shoulder 28, lies a very short distance above the upper edge of flange 31 of collar 29, thus forming in conjunction with said flange, a very thin annular capillary passage 36 for the outflow of fuel from the annular chamber 33. Projected downwardly into the upper enlarged end of bore 25 is a needle valve 37 adapted to seat upon seat 26 and this needle valve has a threaded portion 38 which is threaded into the upper wall of the main casing 10 and is provided at its outer end with a knurled head 39 by means of which it may be readily adjusted. The lower end of each tube 14 is enlarged and mounted in this enlarged portion is a tubular shield comprising an upper cylindrical portion 41 which fits loosely in the upper end of tube 14; a large lower cylindrical portion 42 which fits loosely in the enlarged lower end of tube 14; and an intermediate inwardly and upwardly flared portion 43 which connects the two portions 41 and 42. The shield is so proportioned as to its parts that when it is in its lowest possible position, the plane of junction between portions 43 and 41 is substantially in the plane of the annular fuel passage 36 and the internal diameter of the portion 41 is very slightly in excess of the external diameter of the parts which form the annular passage 36. The relative proportions and arrangements of the parts are substantially those illustrated in Fig. 4 where an attempt has been made to show the parts as accurately as possible. The shell 41 is intended to play freely vertically in its tube 14 and is made of very thin metal so as to be very light and is normally urged to its lower position by a very light spring 45 which encircles it.

The bore 21 is formed in a boss 21' which is nearly surrounded by an air passage 46 which gives a free inlet of air into the lower end of each tube 14, or rather the shell 41—42—43 mounted therein. The lower ends of these several air passages 46 may be independent of each other or, if desired, an inlet manifold 47 may be detachably secured to the lower end of casting 18 so as to provide a single air inlet 48 leading to the several passages 46. Leading upwardly into the fuel pocket 17 of casting 18 is a fuel inlet passage 51 controlled at its inner end by a valve 52 connected by lever 53 with float 16.

The various tubes 14 connect by passages 14', 14'', 14''', and 14'''' in cumulative order with the chamber 11 so that, by slipping the valve 12 endwise, the several carbureting units may be cumulatively connected with the chamber. It will be noticed that this connection is a direct one so that, when any carbureting unit is connected with the chamber 11 that connection is free and unobstructed clear to the outlet from the chamber 11 so that there is no tendency toward condensation of the carbureted air current, as is the case where there is a sudden change of direction of flow through restricted passages, especially where the walls of the passages are in position to be affected by external temperatures.

In operation, the liquid fuel is maintained constantly within annular chambers 33, so that there is continually a thin film of fuel in each annular passage 36 which is held therein by capillary attraction.

In practice it will be found that it is very essential that the weight of the shell 41 combined with the force of spring 45 be very small indeed so that it may be moved by comparatively light currents of air, and commercially I know of no better way of making this shell than of stamped or spun sheet metal. It is also essential, in order that this element be moved at all in the operation of the structure, that its movement be not resisted to any material extent for the reason that the effective lifting force of the currents of air which pass through an apparatus of this kind is not very great. I have also found that the construction of the parts should be such that the area for the passage of air immediately adjacent the fuel outlet be rapidly increased immediately upon the passage of any material current of air through the structure and for that reason the plane of junction between the portion 41 of the guard shell and the portion 43 should be, when the parts are at rest, practically in the plane of the fuel film so that this smaller diameter of the shell will move from that plane when air is drawn through the apparatus at engines' speeds exceeding the lowest desired running speed. I have also found it to be necessary that a uniform quantity of fuel be supplied to each carbureting unit so that, when in action, its carbureting action will be at the maximum. It is for this purpose that the structure is such that the annular passage 36 is fixed in dimensions and the needle valve 37 is then provided in order that the flow of fuel to the annular chamber 33 shall be just sufficient to keep this annular passage 36 filled with oil but the supply be sufficiently restricted to avoid flooding when the air is drawn through the structure. If it were possible to make the structure sufficiently accurate the needle valve would not be necessary, except perhaps, to entirely shut off the flow of fuel to a particular carbureting unit. I have also found in practice that the internal diameter of the lower portion 42 of the guard shell should exceed the internal diameter of the upper portion 41 of the guard shell by an amount which will be sufficient to give the lower portion of the shell an area substantially equal to the area of the upper portion of the shell plus the area of the nozzle, but I am unable to state with any proper degree of accuracy why this relationship needs to be provided. I have also found that the internal diameter of the upper portion 41 of the shell, at least immediately adjacent the plane of junction with the flaring portion 43, should bear a certain relation to the external diameter of the nozzle. If the difference in diameter is too small, I find that because of the necessary looseness of the shell within the tube, there will be sufficient lack of concentricity to permit the shell to touch the nozzle and when this happens, there will be an outward flow of fuel by the capillary action of the shell and this fuel is likely to then close the opening between nozzle and shell when the shell is in its lower part. In fact, when this happens, the fuel is likely to run down the shell and drip out of the air inlets. On the other hand, if the internal diameter of this portion of the shell be too large relative to the nozzle, the air passing the nozzle under the action of the engine pistons at very slow or starting speeds will not have sufficient velocity to become properly carbureted. By a series of experiments, I have found that I get the best results, apparently, from a construction where the internal diameter of the lower portion of the upper part 41 of the shell exceeds the external diameter of the nozzle by about one-sixteenth of an inch and in such construction the shell, while loose in tube 14, should not be so loose as to permit a lack of concentricity of as much as one-thirty-second of an inch. It may be that other relative proportions of these parts may be found without departing from the spirit of my invention and by reciting the facts which have been learned from my experiments I do not desire to be limited to the particular proportions specified, but have set them forth in order that my invention may be as thoroughly understood as I understand it, the principal feature of my invention, as I have already stated, lying in the maintenance of the delivery condition of the nozzle at all times and the entire independence of the guard shell relative to the nozzle.

I claim as my invention:

1. In a carbureter comprising an air passage and a fuel reservoir, a fuel nozzle directed into said air passage and connected with the reservoir, said nozzle comprising a sleeve having an outwardly flaring flange, a tubular bushing having a shoulder engaging said sleeve to hold the same in position, and also having an overhanging flange overhanging the flange of the sleeve to form an annular capillary discharge passage, said bushing having a seat formed therein between its inlet and the discharge to said annular capillary passage, and a needle valve associated with said seat, said needle valve being adjustably mounted in the main body of the structure independent of the bushing.

2. In a carbureter comprising an air passage and a fuel reservoir, a fuel nozzle directed into said air passage and connected with the reservoir, said nozzle comprising a sleeve having an outwardly flaring flange, a tubular bushing having a shoulder engaging said sleeve to hold the same in position, and also having an overhanging flange overhanging the flange of the sleeve to form an annular capillary discharge passage, said bushing having a valve seat formed therein between its inlet and the discharge to said annular capillary passage, and a needle valve associated with said valve seat.

3. In a carbureter comprising an air passage and a fuel reservoir, a fuel nozzle directed into said air passage and connected with the reservoir, said nozzle comprising a sleeve having an outwardly flaring flange, and a tubular bushing having a shoulder engaging said sleeve to hold the same in position, and also having an overhanging flange overhanging the flange of the sleeve to form an annular capillary discharge passage.

4. In a carbureter comprising a main casing having a horizontal valve chamber and a plurality of depending air passages arranged upon opposite sides of the valve chamber and separated from each other to form an open bottom fuel chamber, a complementary casing member having a fuel pocket arranged to complement the open bottom fuel chamber of the main casing, a plurality of fuel nozzles carried by said complementary casing in position to be associated with the several depending air passages and communicating with the interior of the fuel chamber.

5. In a carbureter a fuel delivery structure comprising a main casing having an atomizing chamber formed therein, a fuel chamber communicating with said atomizing chamber, and a nozzle structure mounted in the atomizing chamber, said nozzle structure comprising a tubular member arranged to surround the passage between the fuel chamber and atomizing chamber, and a second member sleeved within the first member and holding the said first member in place, said first and second members having adjacent portions forming a thin substantially horizontal annular passage and said second member embodying a valve seat surrounding the passage between the fuel chamber and the said annular passage, and a valve mounted in said second member and coacting with the seat thereof.

In witness whereof, I have hereunto set my hand and seal at Indianapolis, Indiana, this fifth day of October, A. D. one thousand nine hundred and ten.

JOHN W. RAYMOND. [L. S.]

Witnesses:
 ARTHUR M. HOOD,
 THOMAS W. MCMEANS.